United States Patent [19]
Hesskamp

[11] Patent Number: 6,073,305
[45] Date of Patent: Jun. 13, 2000

[54] DEBRIS BLOWER

[76] Inventor: Scott Hesskamp, 14931 Farmington Rd., Livonia, Mich. 48154

[21] Appl. No.: 09/033,226

[22] Filed: Mar. 2, 1998

[51] Int. Cl.[7] .................................................... A47L 5/14
[52] U.S. Cl. ............................... 15/405; 56/12.8; 415/206
[58] Field of Search ..................... 15/405, 331; 417/279, 417/313; 415/121.2, 169.1, 148, 150, 204, 206; 56/12.8, 13.3, 13.4, 320.1, 320.2, 202, 203

[56] References Cited

U.S. PATENT DOCUMENTS

| | | |
|---|---|---|
| Re. 29,139 | 2/1977 | Messner . |
| 3,441,201 | 4/1969 | Hollenberg ............................... 415/206 |
| 3,539,271 | 11/1970 | Greenwood .............................. 415/204 |
| 3,863,291 | 2/1975 | Woelffer .................................... 15/405 |
| 4,118,826 | 10/1978 | Kaeser . |
| 4,187,577 | 2/1980 | Hansen et al. ............................ 15/405 |
| 4,237,576 | 12/1980 | Stakes ....................................... 15/405 |
| 4,242,794 | 1/1981 | Peterson ................................... 15/405 |
| 4,404,706 | 9/1983 | Loyd ......................................... 15/405 |
| 4,679,983 | 7/1987 | Pietryk et al. ........................... 415/148 |
| 5,107,566 | 4/1992 | Schmid .................................... 15/405 |
| 5,197,266 | 3/1993 | Kambeitz . |
| 5,203,689 | 4/1993 | Duggan et al. ......................... 431/114 |
| 5,735,018 | 4/1998 | Gallagher et al. ....................... 15/405 |
| 5,768,749 | 6/1998 | Ohi ............................................ 15/405 |
| 5,826,416 | 10/1998 | Sugden et al. ......................... 56/320.2 |

OTHER PUBLICATIONS

"Professional Grounds Maintenance Equipment" for Billy Goat Industries, Inc., (7 pages) (No Date Available).
"Little Wonder Blowers" for Little Wonder (4 pages) (1997).
"The Commercial Line That Cuts Your Cost" for Scag Power Equipment Division of Metalcraft of Mayville, Inc. (16 pages) (No Date Available).
"Dixie Chopper—The World's Fastest Lawn Mower" for Magic Circle Corp. (19 pages) (No Date Available).
"Trac Vac Commercial Lawn Care Equipment" for Palmer Products Inc. (4 pages) (No Date Available).
"Jacobsen Model B–40 Blower" for Jacobsen Division of Textron (1 page) (No Date Available).
"Giant–Vac Presents . . . A Double Headed PTO or Hydraulic Drive Blower for Out–Front Mowers" for Giant–Vac Mfg., Inc. (1 page) (No Date Available).
"Exmark Professional Turf Care Equipment" for Exmark (20 pages) (No Date Available).
"Allied Attachments for Exmark Commercial Mowers" for Exmark (1 page) (1996).
"Introducing the Ariens Ex Rider" for Ariens Company (2 page) (No Date Available).

*Primary Examiner*—Robert J. Warden, Sr.
*Assistant Examiner*—Andrew Aldag
*Attorney, Agent, or Firm*—Rader, Fishman & Grauer PLLC

[57] ABSTRACT

A debris blower for use in dispersing and collecting grass clippings, leaves, and other debris from sidewalks, driveways, lawns, golf courses and other ground surfaces. The debris blower is designed to be connected underneath a chassis of a tractor or lawn mower, and includes a housing containing a power-driven fan which rotates in a plane generally parallel to the ground surface. An air flow generated by the fan exits the housing through first and second chutes projecting from the housing. The chutes direct the air flow towards the ground surface. Air flow through the chutes is controlled by deflectors and closures that are moveable to selectively open and close the chutes and to adjust the direction of the exiting air flow.

21 Claims, 4 Drawing Sheets

DEBRIS BLOWER

FIELD OF THE INVENTION

The present invention generally relates to a debris blower used to disperse debris from lawn, driveways or other surfaces. More particularly, the invention relates to a debris blower having a housing that encloses a rotatably mounted fan member that rotates in a plane generally parallel to a ground surface and that discharges an air flow generated by the fan member through at least one chute that projects outward from the housing.

BACKGROUND

Debris blowers are commonly used by commercial lawn maintenance companies that provide service-for-hire multi-seasonal lawn care. In the lawn maintenance industry, speed, efficiency, reliability and labor-saving means are essential for success. The debris blower has continuously filled a vital niche aiding in the dispersion or collection of debris including leaves and grass clippings. Typically, debris blowers are used to disperse grass clipping and leaves from sidewalks and driveways after a lawn cutting. Similarly, the debris blower may be used to disperse clumps of grass from the non-uniform dispersion of clippings by a lawn mower. Additionally, debris blowers are used to direct leaves and other debris into windrows or piles to aid in their collection and removal.

Debris blowers are well known in the art. Typically, debris blowers have an impeller that rotates in a plane perpendicular to a generally horizontal ground surface to direct a blast of air through a discharge chute towards or across the ground surface. These debris blowers are generally mounted to a cart. The cart is comprised of a frame on which an engine is mounted. The frame is supported by a set of wheels to permit mobility of the debris blower. The engine is attached to the impeller by a shaft projecting horizontally from the engine. The impeller is located within a centrifugal-type housing mounted to the engine. The housing consists of a center inlet opposite the shaft and a tangential outlet, typically the discharge chute. A handle assembly mounted to the frame extends upwardly and rearwardly behind the engine to control and guide the debris blower. An operator must manually move the cart to direct the debris blower.

Debris blowers mounted on a cart are limited by speed and efficiency considerations. In particular, the cart is moved manually, limiting the use of the blower to the strength and energy of the operator. A large engine is necessary to drive the impeller, but the large engine also adds additional weight. The greater the weight, the more difficult the cart is to move and the more energy that the operator must expend to operate the debris blower. Additionally, the vertically mounted impeller makes the debris blowers more difficult and awkward to move and operate. The vertical impeller and its housing results in a high center of gravity on the debris blower, making it susceptible to tipping. Similarly, the effects of precession make the debris blower difficult to move and inefficient because large amounts of energy are wasted every time the cart is moved in a manner that disrupts the impeller's vertical plane of rotation. Further, the air flow generated by the impeller can only be exhausted from the housing in a single direction. Baffles or deflectors, which reduce the force of the air flow, must be added to the discharge chute to expand the range of degrees that air exiting the debris blower can be directed at the ground surface.

Other known debris blowers are carried by an operator by hand or on the operator's back. These debris blowers are configured very similarly to the debris blower previously described, with a housing enclosing a vertical impeller mounted to a horizontal shaft driven by an engine. The vertical impeller creates an air flow that is directed tangentially from the housing through a tube that can be directed by the operator towards the debris to be dispersed. While this type of debris blower is easy to move, it must also be light-weight and compact, thereby limiting the size of the impeller and engine, and thus the amount and force of the air flow that can be generated. Additionally, use of this debris blower is limited by the speed and strength of the operator who must carry it.

Yet another type of debris blower is known in which a debris blower with a vertically mounted impeller is mounted forward or behind a tractor or lawn mower in place of a mowing deck. This self-propelled type of debris blower is very similar to the cart-type debris blower previously discussed, except that this debris blower is connected to an engine of the tractor or lawn mower and is no longer manually moved. The tractor or lawn mower engine drives the vertical impeller to generate an air flow and pushes or pulls the debris blower while an operator drives the tractor or lawn mower.

While this self-propelled arrangement alleviates some disadvantages, these debris blowers have limited application because of their configuration. This type of debris blower can only be used with a tractor or lawn mover where the mowing deck is mounted behind or in front of a chassis of the tractor or lawn mower. However, most conventional tractors and lawn mowers attach mowing decks horizontally underneath the chassis of the tractor or lawn mower. Limited clearance between the chassis and ground makes attaching a debris blower with a vertical impeller impossible. Additionally, these debris blowers require additional parts, assembly, labor, and sophistication to mate the tractor or lawn mower to the debris blower. Excess forces are also placed on the debris blower because of a high center of gravity attributed to the vertical impeller. The high center of gravity introduces additional stresses on components of the debris blower, heightening wear and leading to mechanical malfunctions. Further, the high center of gravity and precession make the debris blower awkward to maneuver, reducing the speed at which the debris blower may be operated and increasing the likelihood of tipping the debris blower and chafing or scaring the ground surface. Furthermore, like the cart-type debris mower, baffles or deflectors, which reduce the force of the air flow, must be used to expand the directions in which the air flow can be directed towards a ground surface.

SUMMARY OF THE INVENTION

The present invention is directed to a debris blower for use in dispersing or collecting debris from a variety of ground surfaces such as sidewalks, driveways, lawns, and golf courses. The debris blower includes a housing enclosing a chamber. Inside the chamber, a rotatably mounted fan member rotates in a plane generally parallel to a ground surface. The debris blower is designed to be connected to a wheel-mounted cart, ideally underneath a chassis of a tractor or lawn mower.

In the present invention, the chamber of the housing is defined by a top portion, a side portion, and a bottom portion. Air enters the chamber through an inlet provided in the top portion of the housing. The fan member, which rotates in a plane generally parallel to the ground surfaces, is rotatably mounted to an axle which is perpendicular to the fan member's plane of rotation. The axle has a top end and a bottom end. The bottom end of the axle is connected to the bottom portion of the housing. The top end of the axle extends through the inlet and is equipped with a pulley that is connectable to a power source to drive the fan member. The air flow generated by the fan member exits the chamber through at least one outlet in the side portion of the housing.

The debris blower preferably includes a first and second outlet from which the air flow can exit the housing. The housing side portion defines a periphery of the housing and an inner wall of the chamber. A first tubular chute projects generally tangentially from the periphery, defining the first outlet. Similarly, a second tubular chute projects generally non-tangentially from the periphery, defining the second outlet.

The first and second tubular chutes are generally rectangular in shape. The second tubular chute has an arcuate side surface to streamline its shape, enhancing the air flow exiting the housing therethrough. The second tubular chute directs the air flow in front of the chassis of the tractor or lawn mower. The first chute directs the air flow to a side of the chassis of the tractor or lawn mower.

Both first and second tubular chutes can be equipped with an adjustably positioned deflector system that is comprised of first, second and third deflectors that can be used to re-direct the air flow exiting the housing through the respective chute. The first deflector pivots about an axle that permits this deflector to be pivoted angularly downwards or upwards, to change the direction of the air flow exiting the chute. The chute has sides provided with slots through which the first deflector's axle extends to permit the deflector to be vertically adjusted inside the chute by moving the axle up and down within the slots. The second and third chutes are mounted perpendicularly under the first deflector and pivot towards each other to form a nozzle to concentrate the air flow exiting the chute to generate a jet of air that can be directed towards the ground surface.

The air flow through the first and second outlets is controlled by a closure that is selectively moveable to open and close these outlets. Ideally, the closure is an arcuate slide that conforms to the shape of the side portion of the housing. The closure resides in the chamber adjacent to the inner wall of the side portion. A lateral slot in the side portion allows the closure to be connected to a lever. The lever can be moved laterally to selectively move the closure between the first and second outlets.

The inlet to the housing is covered with the cage. The cage is perforated and rises above the inlet. The cage increases surface area through which air is permitted to enter the inlet. The cage incorporates an opening, covered with bars, designed to provide a non-obstructive path for air to enter through the cage to the inlet even if other surfaces of the cage are covered by debris.

A second embodiment of the debris blower includes a third outlet defined by a third tubular chute that extends tangentially from the housing periphery. The third chute directs the flow of air to a side of the tractor or lawn mower chassis opposite the side controlled by the first tubular chute.

BRIEF DESCRIPTION OF THE DRAWINGS

The features and inventive aspects of the present invention will become more apparent upon reading the following detailed description, claims, and drawings, of which the following is a brief description:

DETAILED DESCRIPTION OF PREFERRED EMBODIMENTS

Figure 1:
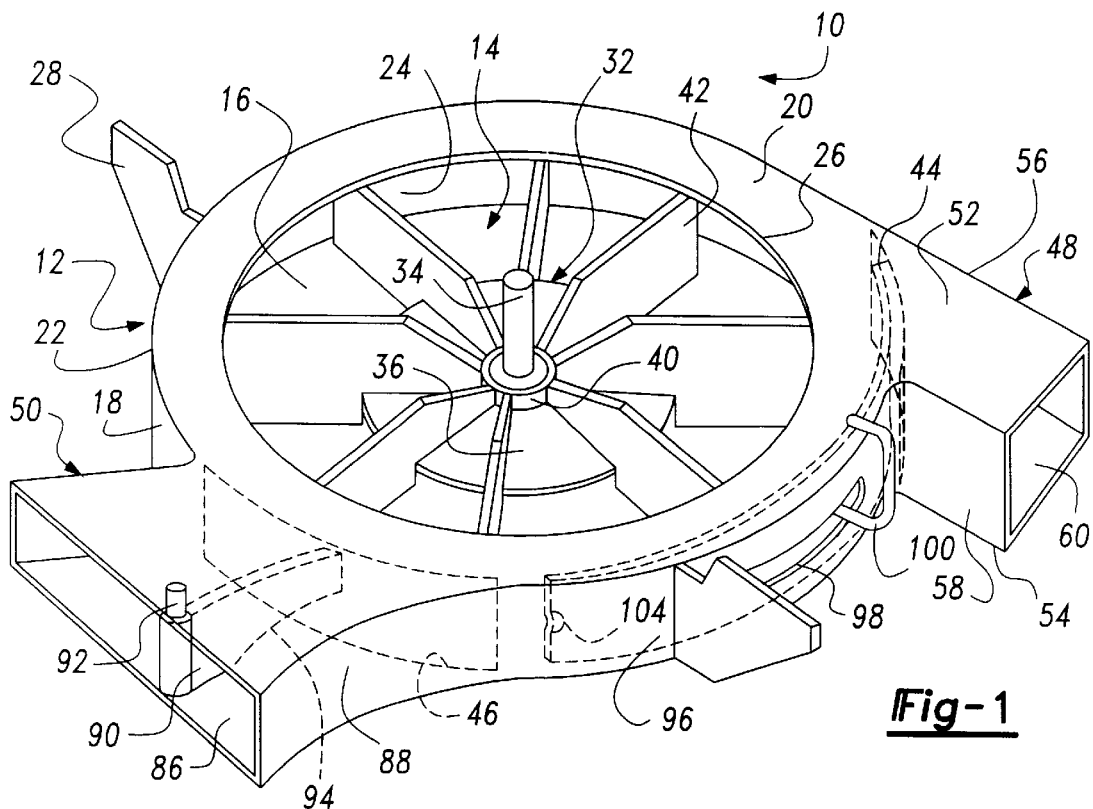
FIG. 1 is a perspective view of a debris blower in accordance with the present invention.

FIG. 1 shows a debris blower 10 connectable to a chassis of a lawn mower, tractor, or other wheel-mounted cart (not shown) in place of a mowing deck (not shown) according to the instant invention. Debris blower 10 can be attached underneath, forward or behind the chassis of the lawn mover or tractor. A power source (not shown) used in conjunction with the lawn mower or tractor is used to operate debris blower 10. Debris blower 10 includes a housing 12 enclosing a chamber 14 defined by a bottom portion 16, a side portion 18, and a top portion 20.

Housing 12 is generally circular but it is envisioned that it could be any polygon shape. Bottom portion 16 and top portion 20 are preferably steel plates. Side portion 18 is formed by arcuate plates preferably made from steel that extend generally vertically upwards from bottom portion 16 to top portion 20. Side portion 18 defines a periphery 22 of the housing 12 and an inner wall 24 of chamber 14.

Top portion 20 is provided with an inlet 26 that allows air to enter chamber 14 of housing 10. Inlet 26 is generally centrally located on top potion 20, but could be located anywhere within periphery 22. Optionally, at least one mounting means 28, such as a bracket or other conventional fastener, is mounted to side portion 18 along periphery 22 or on top portion 20 to permit debris blower 10 to be connected to the chassis of the tractor or lawn mower. However, the orientation, configuration, size, and type of mounting means 28 is dependent on the tractor or lawn mower to which blower 10 is to be connected.

A fan member 32 is rotatably mounted in chamber 14. Fan member 32 rotates in a plane generally parallel to the ground surface, to generate an air flow. Fan member 32 is adaptable to a power source to provide the necessary power to rotate fan member 32. Preferably, fan member 32 is mounted to an axle 34, which is perpendicular to the fan member's plane of rotation. Fan member 32 is provided with a base portion 36, an aperture 38 (See FIG. 4) centrally located on base portion 36, a ring 40 connected to base portion 36 that defines a circumference of aperture 38, and several blades 42 that extend generally radially from ring 40.

Preferably, eight or more blades 42 equally spaced around ring 40 are used to balance fan member 32 and reduce noise generated by rotating fan member 32. Base portion 36 is generally circular and extends radially outwards approximately one half of a longitudinal length of blades 42. Blades 42 are connected to base portion 36 to provide lateral and radial stability.

Side portion 18 is provided with first and second outlets 44 and 46, respectively, which are spaced apart circumferentially about periphery 22 and allow the air flow generated by fan member 32 to exit housing 14. First chute 48 projects tangentially from periphery 22 at first outlet 44. First chute 48 is designed to direct the air flow to a side of the chassis of the tractor or lawn mower. Second chute 50 projects non-tangentially (i.e. radially) from periphery 22 at second outlet 46, Second chute 50's non-tangential orientation is defined by a line bisecting housing 12 and generally perpendicularly intersecting a plane defining second outlet 46. Second chute 50 is designed to direct the air flow in front of the chassis of the tractor or lawn mower. First chute 48 and second chute 50 are tubular and generally rectangular in shape, but other shapes could also be utilized.

First chute 48 is defined by a top surface 52, bottom surface 54, first side surface 56, and second side surface 58. Bottom surface 54 connects to bottom portion 16 of housing 12. First side surface 56 and second side surface 58, defining the height of the chute, are generally straight surfaces that extend upwards from bottom surface 54 to top surface 52 and connect to side portion 18. Top surface 52 connects to top portion 20 of housing 12. Chute 48 defines an opening 60 through which the air flow directed through this chute exits the debris blower.

Figure 2:
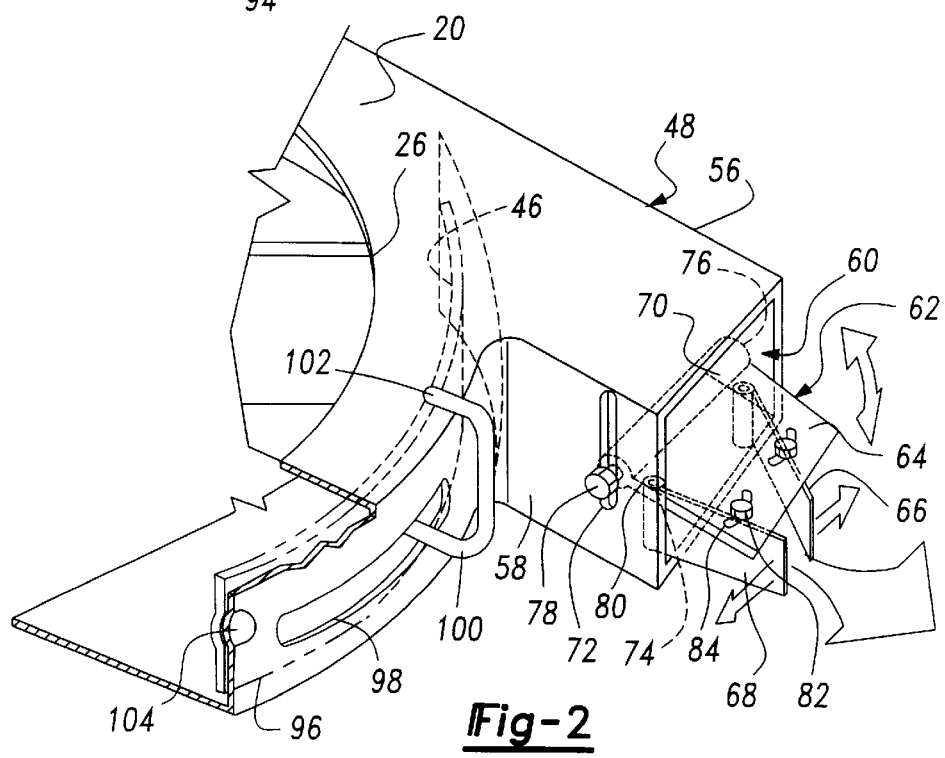
FIG. 2 is a fragmentary perspective view of a side of the debris blower.

FIG. 2 shows an adjustable pivotal deflector system 62 which is retained inside chute 48 and extends through opening 60 to redirect the exiting air flow. The deflector system 62 is comprised of a first, second and third deflectors 64, 66, 68, respectively, that combine to redirect the exiting air flow. First deflector 64 pivots about axle 70, which enables deflector 64 to optionally direct the air flow exiting chute 48 downwards towards the ground surface or upwards away from the ground surface. Slots 72 cut through side surfaces 56 and 58 extend generally vertically downward from top surface 52 for approximately one half the height of chute 48. Axle 70 has a first end 74 and a second end 76, which are threaded and extend through slots 72. Adjustable fasteners 78, such as screws or nuts, are retained on ends 74 and 76 and clamp onto axle 70 to fix deflector 64 in both a vertical position inside chute 48 and a angular position relative to axle 70. When fasteners 78 are loosened, deflector 64 can pivot angularly downwards towards the bottom portion 54 of chute 48 to direct the exiting air flow towards the ground surface or upwards towards the top portion 52 of chute 48 to direct the exiting air flow away from the ground surface. Additionally, loosening of fasteners 78 permits deflector 64 to be adjusted vertically within slots 72 to raise or lower deflector's 64 vertical position within chute 48 to vary the direction of the air flow exiting chute 48.

Generally perpendicular to deflector 64 and the ground surface are second and third deflectors 66 and 68, respectively. Both deflectors 66 and 68 are pivotally connected to the lower side of deflector 64 on vertical axles 80, which extend downwardly from deflector 64. Axles 80 connect deflectors 66 and 68 to deflector 64 by a nut and bolt combination or other conventional fastening means. Arcuate slots 84 are cut through deflector 64. Deflector adjusters 82, a nut and bolt combination or other conventional fastening means, protrude through slots 84 to connect and clamp deflectors 66 and 68 to deflector 64 in their desired position. Pivoting deflector 66 clockwise and deflector 68 counter-clockwise to the extent permitted by slots 84, forms a nozzle that narrows the air flow stream exiting opening 60 to create a high-force air stream that can be directed towards the ground surface.

Optionally, at least one mounting means, a bracket or other conventional fastener, may be mounted on surfaces of the chutes 48 or 50 to aid in securing debris blower 10 to the tractor or lawn mower.

Second chute 50, defining an opening 86, is substantially similar to first tubular chute 48 except that side surface 88 is generally arcuate to stream-line chute 50 to minimize obstructions that may otherwise disturb the air flow entering such chute from second outlet 46 and to provide clearance for a front wheel of the tractor or lawn mower. A similar deflector system 62 (not shown) can be adapted to chute 50 to direct the air flow exiting the chute.

Inside chute 50, a removable, arcuate baffle 90 extends from the chamber 14 to opening 86 for the entire height of chute 50. Baffle 90 is pivotally mounted inside chute 50 by retaining means 92, conventional fasteners such as nuts and bolts, which connect and clamp baffle 90 to the top and bottom surfaces of chute 50. Baffle 90 is designed to catch a portion of the air flow generated by fan member 32 that tangentially exits chamber 14 through outlet 46. A notch 94 in baffle 90 near chamber 14 permits some portion of the air flow exiting outlet 46 to bypass baffle 90 unobstructed. The air flow captured by baffle 90 is redirected to provide an even distribution of the air flow exiting through opening 86.

FIGS. 1 and 2 shows closure 96, which regulates the air flow exiting housing. Preferably, closure 96 is an arcuate slide preferably made of sheet metal that generally conforms with side portion 18. Closure 96 resides adjacent to inner wall 24.

A lateral slot 98 is provided in side portion 18. A lever 100 is connected to closure 96 and protrudes outwardly through slot 98. Lever 100 extends vertically upwards on the outside of housing 12 and terminates in a handle 102 which permits lever 100 to be conveniently reached and manipulated by an operator of debris blower 10. Lever 100 may be manually moved laterally in slot 98 to selectively move closure 96 to close off the air flow through first outlet 44 and open second outlet 46 to the air flow, to close off the air flow through second outlet 46 and open first outlet 44 to the air flow, or to partially open both first outlet 44 and second outlet 46 simultaneously. An engaging means 104 is used to lock closure 96 into positions to close off outlets 44 and 46 when closure 96 is selectively moved. Although a number of conventional engaging means could be employed, a detent system with interlocking detents on closure 96 and inner wall 24 can be used to lock closure 96 in the proper positions to optionally close off outlet 44 or outlet 46. Optionally, closure 96 may run in a track connected to bottom portion 16 or top portion 20 or may be connected to bearings to help guide the closure as it slides between positions.

Figure 5:
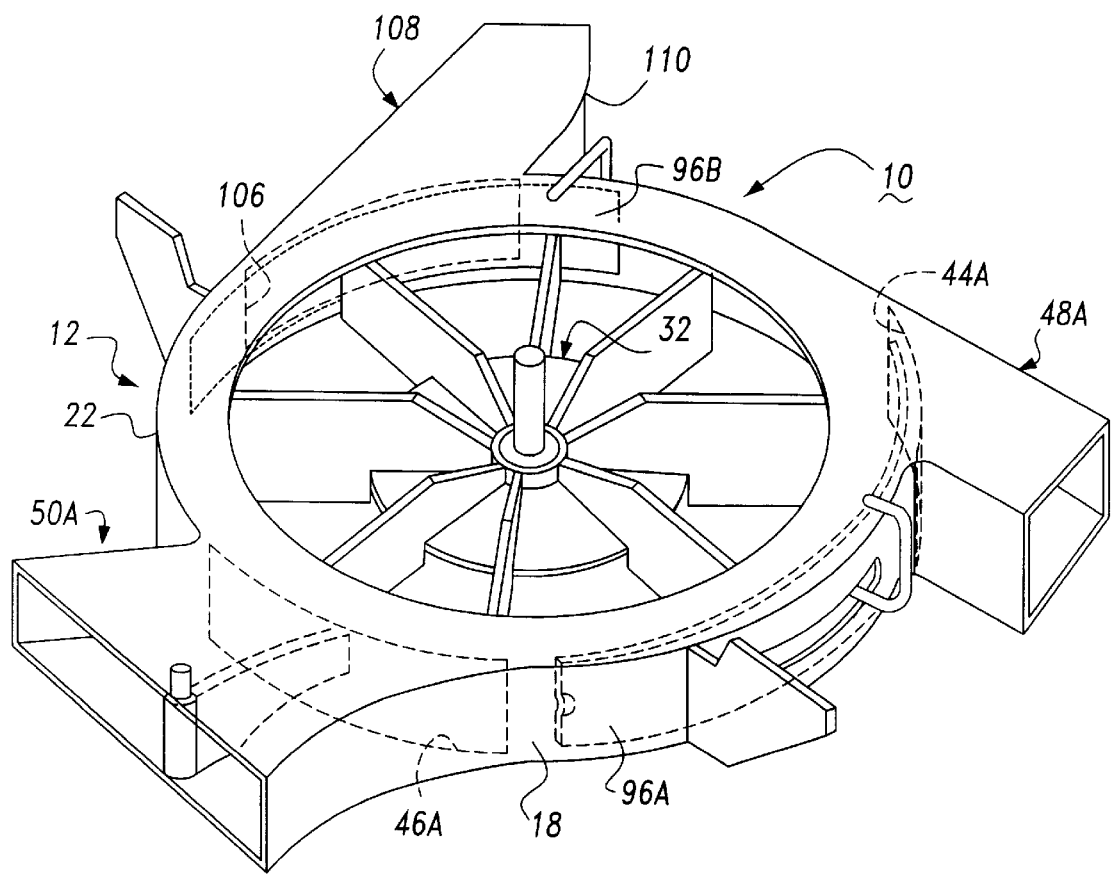
FIG. 5 is a perspective view of an alternative embodiment for the debris blower.

FIG. 5 shows an alternative embodiment of the present invention. Side portion 18 is provided with a first outlet 44A, a second outlet 46A, and a third outlet 106 which are spaced apart circumferentially about periphery 22 and allow the air flow generated by fan member 32 to exit housing 12. A first chute 48A projects generally tangentially from periphery 22 at first outlet 44A. A second chute 50A projects generally non-tangentially or radially from periphery 22 at second outlet 46A. First chute 48A and second chute 50A are substantially the same as first chute 48 and second chute 50, respectively, as previously discussed. Third chute 108 projects tangentially from periphery 22 at third outlet 106. Third chute 108 is designed to direct the air flow to a side of the tractor or lawn mower opposite of first chute 48A. Third chute 108 is substantially similar to first chute 48A and second chute 50A except that a side surface 110 is generally arcuate to stream-line chute 108 to minimize obstructions that may otherwise disturb the air flow exiting such chute.

Similarly in the alternative embodiment, control of air flow exiting housing 12 is regulated by closures 96A and 96B. Closure 96A is substantially the same to closure 96 as previous discussed. Closure 96B is substantially the same as closure 96 except that closure 96B is selectively moveable to close off the air flow through first outlet 44A and open third outlet 106 to the air flow, to close off the air flow through third outlet 106 and open first outlet 44A to the air flow, or to partially open both first outlet 44A and third outlet 106 simultaneously.

Figure 4:
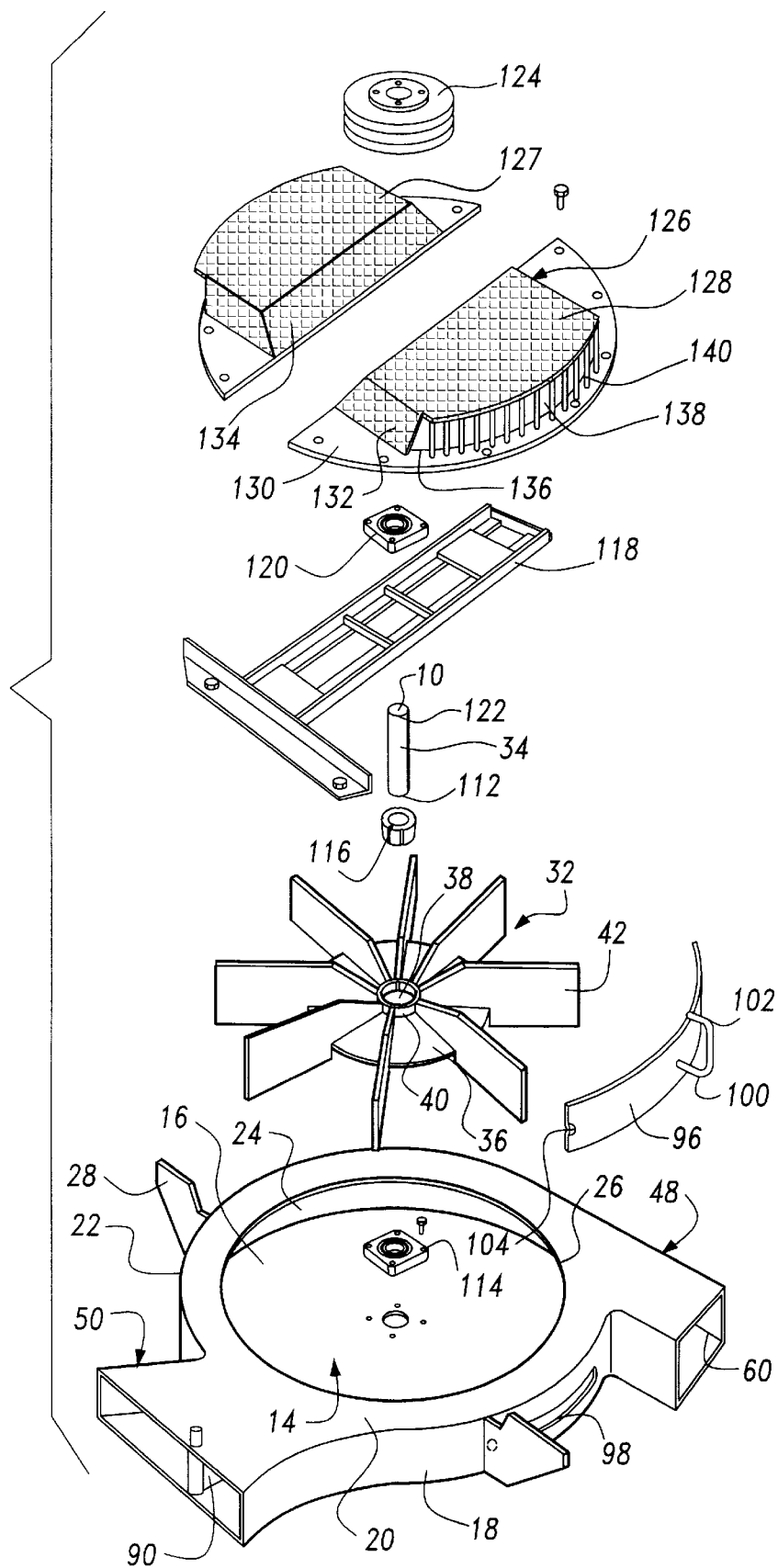
FIG. 4 is an exploded view of the debris blower.

FIG. 4 shows that axle 34 has bottom and top ends 110 and 112, respectively. Axle 34 is rotatably mounted on bottom portion 16 of housing 12 through a first bearing 114, which is connected to bottom portion 16 by conventional fasteners. Bearing 114 is generally centered inside of chamber 14. Base portion 36 of fan member 32 is rotatably mounted on a bushing 116, which retains axle 34 above first bearing 114. Preferably, bushing 116 is a taper fit bushing, although other bushings and the like, commonly known in the art, could be used. Aperture 38 of fan member 32 receives bushing 116 and axle 34. Bushing 116 is locked into ring 40 by conventional means to retain fan member 32 on axle 34.

Axle 34 extends upwards from within chamber 14 and through top portion 20. Preferably, axle 34 extends through inlet 26. Top end 112 of axle 34 extends through a brace 118. Brace 118 is preferably a T-member that extends across inlet 26 and is connected to top portion 20. Brace 118 carries a second bearing 120, which retains axle 34. A combination of brace 118 and second bearing 120 provides stability for axle 34.

The top end 112 of axle 34, which extends above second bearing 120, defines a drive point 122. A power source from the lawn mower or tractor can be connected at drive point 122 to axle 34 to propel fan member 32, such as by a belt and pulley system. In a belt and pulley system, a pulley 124 is connected to drive point 122. A belt (not shown) connects pulley 124 to the power source to rotate the fan member 32. Additional pulleys (not shown) can be connected to brace 118 or housing 12 in various configurations to provide accessibility to drive point 122 to meet the configuration of the power source of the lawn mower or tractor.

Figure 3:
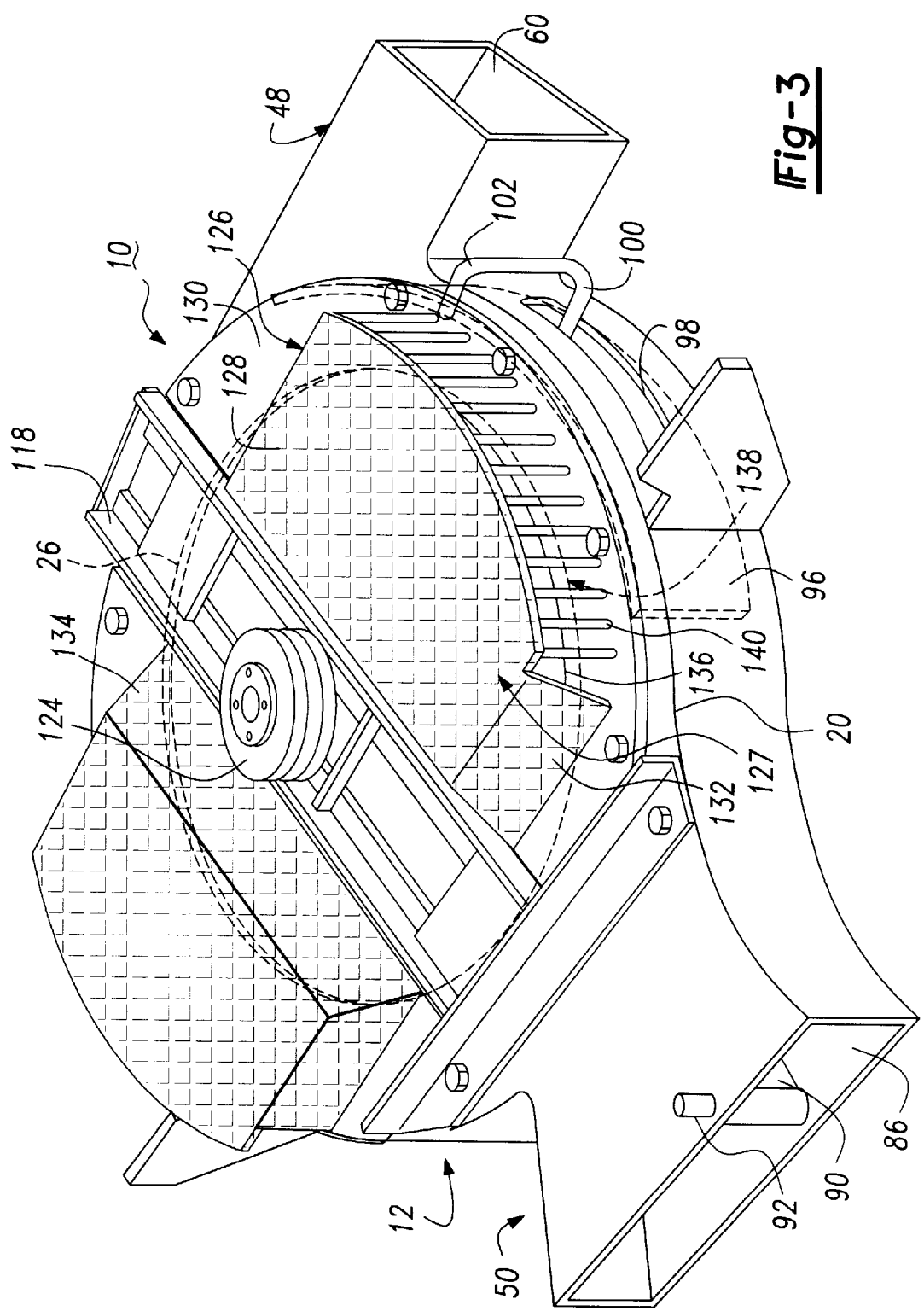
FIG. 3 is a perspective view of a top of the debris blower.

FIG. 3 shows a cover 126 which is placed over inlet 26. Cover 126 is ideally a pair of cages provided with perforations 127 designed to permit air to enter inlet 26. The cages 126 are mounted to top surface 20 with conventional fasteners, such as nuts and bolts, and rise above and cover inlet 26 and top surface 20 increasing the surface area in which air can enter inlet 26. Brace 118 separates the pair of cages 126. Each cage 126 has a top portion 128 and a base 130. The top portion 128 is connected to side portions 132 that project vertically downward to connect to base 130. A rear portion 134 is connected to top portion 128 and side portions 132 and slopes downward from the top portion 128 towards brace 118 to connect with base 130. Base 130 is preferably a steel plate to which the side portions 132 and rear portion 134 are fastened. Base 130 covers approximately one half of inlet 26 and is fastened to the top surface 20 of housing 12 by conventional means. An aperture 136 exists in base 130 to expose inlet 26. Top portion 128, side portions 132, and rear portion 134 are provided with perforations 127, and are preferably made out of expanded metal.

Each cage 126 is provided with an opening 138, which is larger than the perforations 127 already provided in cage 126. Opening 138 is covered with at least one bar 140 that extends either generally downward from the top portion 128 to base 130 or across opening 138. The purpose of opening 138 is to insure that an adequate supply of air can pass through cages 126 to enter inlet 26. Although perforations 127 of cage 126 are designed to permit air to enter inlet 26, the perforations 127 can easily be clogged by large debris floating in the air, such as leaves, which are sucked towards cages 126 by the rotation of fan member 32. If perforations 127 become clogged with debris, air may still be drawn through inlet 26 and cages 126 through opening 138, which is enlarged to permit debris, such as leaves, to pass through cage 126 with the air flow, insuring a unobstructed path through which air may enter inlet 26.

Preferred embodiments of the present invention have been disclosed. A person of ordinary skill in the art would realize, however, that certain modifications would come within the teachings of this invention. Therefore, the following claims should be studied to determine the true scope and content of the invention.

I claim:

1. A blower for blowing debris comprising:
    a housing having a chamber defined by a top portion, a side portion, and a bottom portion;
    a fan member rotatable mounted in said chamber for rotating in a plane generally parallel to a ground surface to generate an air flow, said fan member being adapted for connection to a power source for rotation thereby;
    at least one inlet provided in said top portion of said housing that allows air to enter said housing;
    said side portion defines a periphery of said housing;
    at least two outlets are provided in said periphery of said housing, wherein said outlets are spaced apart circumferentially about said periphery of said housing; and
    at least two chutes connect to said periphery of said housing and extend from said at least two outlets, wherein at least one chute extends generally tangentially relative to said perphery of said housing and at least another chute extends generally non-tangentially relative to said periphery of said housing.

2. The blower in claim 1, wherein said fan member is mounted on an axle, and said axle extends through said inlet provided in said top portion of said housing.

3. The blower in claim 1, wherein a pulley is adapted to said power source to rotate said fan member.

4. The blower in claim 1, wherein said at least another chute is defined by at least one arcuate surface.

5. The blower in claim 1, wherein a baffle is retained inside of said at least another chute to redirect said air flow exiting said outlet.

6. The blower in claim 5, wherein said baffle is provided with a notch to permit a portion of said air flow exiting the outlet corresponding to said at least another chute to by-pass said baffle.

7. The blower in claim 1, wherein said blower is adaptable to connect underneath a chassis of a wheel-mounted cart.

8. The blower in claim 7, wherein said outlets are positioned for directing said air flow exiting said housing to be in front of and to a side of a wheel-mounted cart.

9. The blower of claim 1, wherein said blower is provided with at least one closure which is selectively moveable to open and close said outlets.

10. The blower of claim 9, wherein said closure slides adjacent to an inner wall of said chamber through a slot provided in said side portion of said housing.

11. The blower in claim 1, wherein at least one cage covers said inlet, and said cage is provided with perforations.

12. The blower in claim 11, wherein said cage is provided with at least one opening larger in diameter than said perforations of said cage to permit air and debris to flow into said cage even if said perforations are covered with debris, and said opening is covered by at least one bar to cover said opening.

13. The blower in claim 1, wherein at least one of said at least two chutes is provided with an adjustably positioned deflector that redirects the air flow exiting said housing.

14. A blower for blowing debris comprising:

a housing having a chamber defined by a top portion, a side portion, and a bottom portion;

at least one inlet that permits air to enter said housing;

a fan member mounted in said housing that rotates to generate an air flow;

said side portion provides at least one outlet for said air to exit said housing;

a chute extends from said side portion defining said outlet to direct said air flow exiting through said outlet;

a deflector system mounted inside said chute to redirect said air flow exiting said chute;

said deflector system being provided with adjustable first, second, and third deflectors;

said first deflector being adjustable vertically and angularly inside of said chute to redirect said air flow exiting said chute downwards towards and upwards away from a ground surface;

said second and third deflectors being generally perpendicular to said first deflector and pivotally connected to a lower side of said first deflector, whereby said second and third deflectors narrow and redirect said air flow exiting said chute.

15. A blower for blowing debris comprising:

a housing having a chamber defined by a top portion, a side portion, and a bottom portion;

at least one inlet that permits air to enter said housing;

a fan member mounted in said housing that rotates to generate an air flow;

said side portion provides at least one outlet for said air to exit said housing;

a chute extends from said side portion defining said outlet to direct said air flow exiting through said outlet;

a deflector system mounted inside said chute to redirect said air flow exiting said chute;

said deflector system being provided with a first deflector and adjustable second and third deflectors;

said first deflector provided inside said chute to redirect said air flow exiting said chute downwards towards a ground surface; and said second and third deflectors being generally perpendicular to said first deflector and pivotally connected to a lower side of said first deflector, whereby said second and third deflectors narrow and redirect said air flow exiting said chute.

16. A horizontal blower for blowing debris, adaptable for mounting to a tractor, comprising:

a housing having a chamber defined by a top portion, a side portion, and a bottom portion, wherein said side portion defines a periphery of said housing;

a fan member rotatably mounted in said chamber for rotating in a plane generally parallel to a ground surface to generate an air flow;

at least one inlet provided in said top portion of said housing that allows air to enter said housing;

said fan member is mounted on an axle, and said axle extends through said inlet provided in said top portion of said housing with said axle being connectable to a power source to rotate said fan member;

a first outlet and a second outlet, spaced apart circumferentially about said periphery of said housing, for said air flow to exit said housing;

a first chute connected to said first outlet and extending generally tangentially relative to said periphery of said housing;

a second chute connected to said second outlet and extending generally non-tangentially relative to said periphery of said housing;

a perforated cage being connected to said top portion of said housing to cover said inlet; and at least one closure being selectively moveable to open or close said first outlet and said second outlet.

17. The horizontal blower in claim 16, wherein said first and second outlets are positioned for directing said air flow exiting said housing to be in front of and to a side of a tractor.

18. The horizontal blower in claim 16, wherein said cage is provided with at least one opening larger in diameter than said perforations of said cage to permit air and debris to flow into said cage even if said perforations are covered with debris, and said opening is covered by at least one bar to cover said opening.

19. The horizontal blower of claim 16, wherein said closure slides adjacent to an inner wall of said chamber through a slot provided in said side portion of said housing.

20. The horizontal blower in claim 19, wherein a baffle is retained inside said second chute to redirect said air flow exiting said second outlet.

21. The horizontal blower in claim 20, wherein said baffle is provided with a notch to permit a portion of said air flow exiting said second outlet to by-pass said baffle.

* * * * *